(12) United States Patent
Luo et al.

(10) Patent No.: US 7,003,384 B2
(45) Date of Patent: Feb. 21, 2006

(54) METHOD AND APPARATUS FOR SELF-DIAGNOSTICS OF A VISION SYSTEM

(75) Inventors: Yun Luo, Livonia, MI (US); Jon K. Wallace, Redford, MI (US); Robert Dziadula, Farmington Hills, MI (US); Russell J. Lynch, West Bloomfield, MI (US); Farid Khairallah, Farmington Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 116 days.

(21) Appl. No.: 10/692,949

(22) Filed: Oct. 24, 2003

(65) Prior Publication Data

US 2005/0090957 A1 Apr. 28, 2005

(51) Int. Cl.
*G05D 1/00* (2006.01)
*G06F 7/00* (2006.01)

(52) U.S. Cl. .......................... 701/36; 701/28
(58) Field of Classification Search .................. 701/45, 701/36, 200, 207; 348/148, 118, 113, 135, 348/139, 142
See application file for complete search history.

(56) References Cited

U.S. PATENT DOCUMENTS 5,330,226 A 7/1994 Gentry et al.
5,477,459 A * 12/1995 Clegg et al. ................. 701/300
2004/0032493 A1 * 2/2004 Franke et al. ................ 348/148

OTHER PUBLICATIONS

"Stereo Vision With the Use of a Virtual Plane in the Space", Bernard Couapel, Chinese Journal of Electronics, vol. 4, No. 2, dated Apr. 1995.

* cited by examiner

*Primary Examiner*—Yonel Beaulieu
(74) *Attorney, Agent, or Firm*—Tarolli, Sundheim, Covell & Tummino L.L.P.

(57) ABSTRACT

A method and apparatus (20) for recognizing and determining a location of an object (40) in an area of interest (31) comprises an imaging device (61) for obtaining an image of the area of interest. At least three identifying marks (104) are located at predetermined positions in the area of interest (31). The apparatus (20) also comprises a memory (78) in which the predetermined positions of the at least three identifying marks (104) are stored. A controller (80) determines whether the imaging device (61) is calibrated properly by analyzing the image obtained by the imaging device to determine whether positions of the at least three identifying marks (104) in the obtained image correspond to the predetermined positions stored in the memory (78). The controller (80) is also adapted to determine whether a view of the area of interest (31) from the imaging device (61) is obstructed.

40 Claims, 5 Drawing Sheets

METHOD AND APPARATUS FOR SELF-DIAGNOSTICS OF A VISION SYSTEM

TECHNICAL FIELD

The present invention is directed to a vision system for recognizing an object and determining a location of the object in an area of interest. More particularly, the present invention is directed to a method and apparatus for self-diagnostics of a vision system in a vehicle occupant protection system of a vehicle.

BACKGROUND OF THE INVENTION

Vehicle occupant protection systems typically includes an inflatable device, such as an air bag, that is inflatable for helping to protect an occupant of a vehicle. Some vehicle occupant protection systems control the inflatable device in response to occupancy of the seat, a determination of whether an object on the seat is animate or inanimate, a determination that a reward facing child seat is present on the seat, and/or a determination of an occupant's position, weight, size, etc. An exemplary vehicle occupant protection system is disclosed in U.S. Pat. No. 5,330,226.

Some vehicle occupant protection systems use cameras to determine the location of the occupant in the passenger compartment of the vehicle. Inflation of the inflatable device is controlled in response to the determined occupant location. At times, the view of the cameras into the passenger compartment may become obstructed. For example, if the occupant is reading a newspaper, the view of the cameras into the passenger compartment may be obstructed. Excessive dirt or other substances on a housing for the cameras may also obstruct the view of the cameras into the passenger compartment. Additionally, changes in temperatures, vibrations, and other factors that are frequency experienced by vehicles may cause the cameras to come out of calibration. When the cameras come out of calibration, the determined location of the passenger may be erroneous. Thus, it is desirable to prevent an erroneous determination of the location of the occupant in response to the view of the cameras becoming obstructed or the cameras coming out of calibration.

SUMMARY OF THE INVENTION

The present invention relates to an apparatus for determining a location of an object in an area of interest. The apparatus comprises an imaging device for obtaining an image of the area of interest. At least three identifying marks are located at predetermined positions in the area of interest. The apparatus also comprises a memory in which the predetermined positions of the at least three identifying marks are stored. A controller determines whether the imaging device is calibrated properly by analyzing the image obtained by the imaging device to determine whether positions of the at least three identifying marks in the obtained image correspond to the predetermined positions stored in the memory. The controller determines the location of the object in the area of interest when the imaging device is calibrated properly.

In accordance with another aspect, the present invention relates to a method of self-diagnostics of an apparatus for determining a location of an object in an area of interest. The method comprises the steps of obtaining an image of the area of interest using an imaging device; locating at least three identifying marks at predetermined positions in the area of interest; storing in a memory the predetermined positions of the at least three identifying marks; determining whether the imaging device is calibrated properly by analyzing the obtained image to determine whether positions of the at least three identifying marks in the obtained image correspond to the predetermined positions stored in the memory; and determining a location of the object in the area of interest when the imaging device is calibrated properly.

In accordance with a further aspect, the present invention relates to an apparatus for determining a location of an object in an area of interest. The apparatus comprises an imaging device for obtaining an image of the area of interest. A controller analyzes a feature of the obtained image to determine whether a view of the area of interest from the imaging device is obstructed. The apparatus also comprises an indicator that is actuatable for indicating to the object that the view is obstructed. The controller controls actuation of the indicator. The controller analyzes the obtained image to determine the location of the object when the view is unobstructed.

In accordance with yet another aspect, the present invention relates to a method of self-diagnostics of an apparatus for determining a location of an object in an area of interest. The method comprises the steps of obtaining an image of the area of interest with an imaging device; analyzing a feature of the obtained image to determine whether a view of the area of interest from the imaging device is obstructed; providing an indication to the object when the view is obstructed; and analyzing the obtained image to determine the location of the object when the view is unobstructed.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF THE PREFERRED EMBODIMENT

Figure 1:
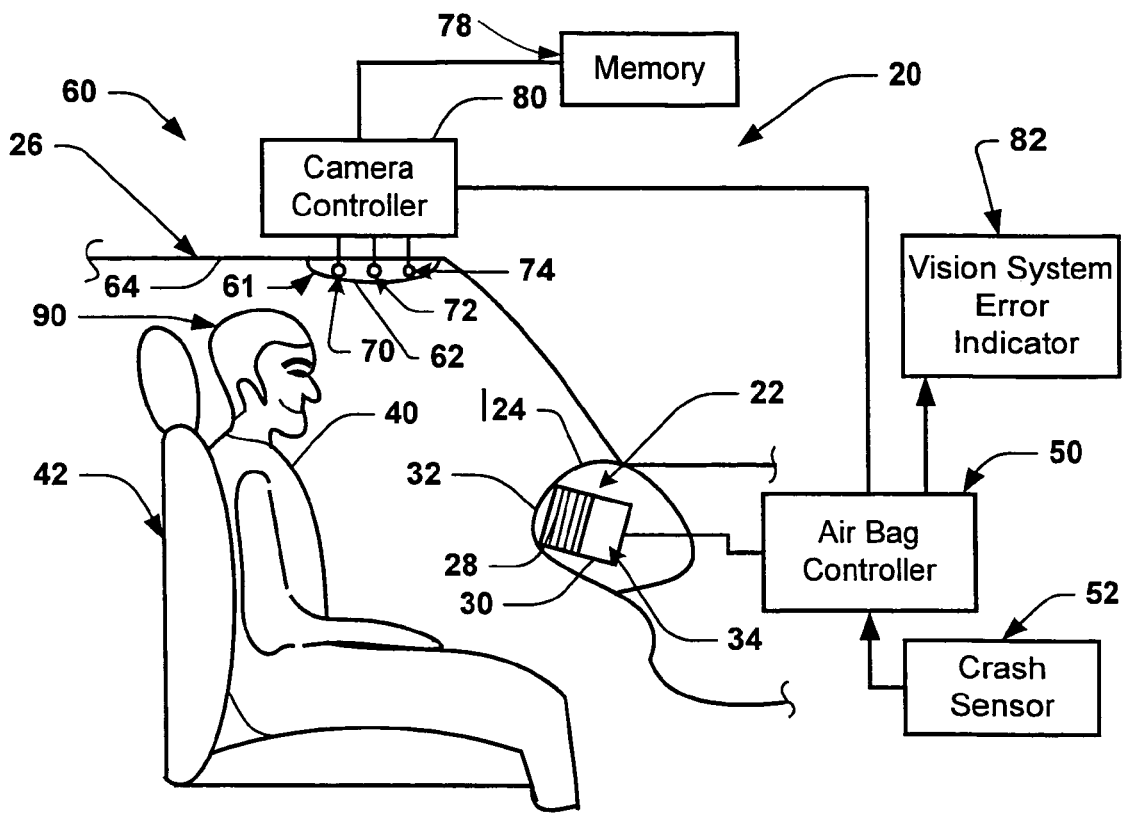
FIG. 1 is a schematic illustration of a vehicle occupant protection system constructed in accordance with an exemplary embodiment of the present invention and associated with a seat of a vehicle.

FIG. 1 is a schematic illustration of a vehicle occupant protection system 20 in accordance with exemplary embodiment of the present invention. The vehicle occupant protection system 20 includes an air bag assembly 22 that is mounted in an opening of an instrument panel 24 of a vehicle 26. The air bag assembly 22 includes an air bag 28. FIG. 1 illustrates the air bag 28 in a deflated and folded condition stored within an air bag housing 30. The air bag 28 is adapted to inflate in response to receiving inflation fluid. During inflation, the air bag 28 expands through the opening in the instrument panel 24 and into a passenger compartment 31 of the vehicle 26. A cover 32 covers the stored air bag 28 and closes the opening in the instrument panel 24. The cover 32 is adapted to open during inflation of the air bag 28.

The air bag assembly 22 further includes an inflation gas control portion 34 that is operatively coupled to the air bag 28. The inflation gas control portion 34 may include a plurality of inflation fluid sources (not shown) and vent valves (not shown) for controlling inflation of the air bag. For example, the inflation gas control portion 34 may control the timing of inflation, the flow of inflation gas during inflation, the bag profile as a function of time, and the inflation gas pressure. The air bag 28, when inflated into the passenger compartment 31 of the vehicle 26, helps to protect an occupant 40 that is seated on a vehicle seat 42 associated with the vehicle occupant protection system 20.

Figure 3:
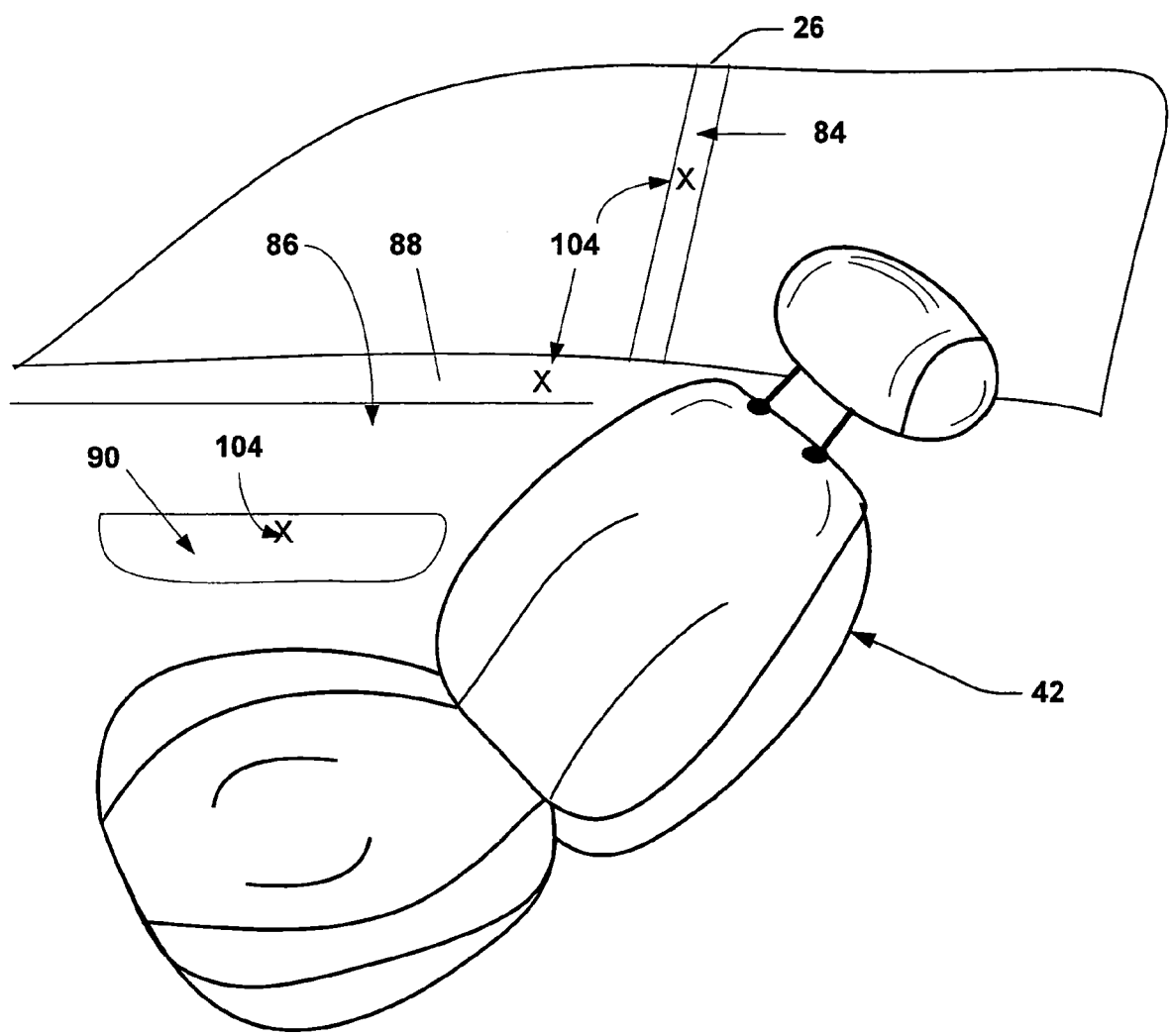
FIG. 3 is a perspective view of an empty passenger seat and a portion of the vehicle including identifying marks of the vehicle occupant protection system of the present invention.

The vehicle seat 42 illustrated in FIGS. 1 and 3 is a passenger seat of the vehicle 26. Although the vehicle occupant protection system 20 is described as being associated with the passenger seat 42 of the vehicle 26, the vehicle occupant protection system 20 may alternatively, or additionally, be associated with other seats of the vehicle 26. The vehicle occupant protection system 20 may also control actuation of other vehicle occupant protection devices, such as side air bags.

An air bag controller 50 is operatively connected to the air bag assembly 22 to control the inflation gas control portion 34 and, in turn, control the inflation of the air bag 28. The air bag controller 50 can take any of several forms such as a microcomputer, discrete circuitry, an application-specific-integrated-circuit ("ASIC"), etc. The air bag controller 50 is further connected to a vehicle crash sensor 52, such as one or more vehicle crash accelerometers. The air bag controller 50 receives output signals from the crash sensor 52 and, in accordance with a control algorithm, determines if a deployment crash event is occurring. A deployment crash event is a crash event in which it is desirable to inflate the air bag 28. There are several known control algorithms that may be used for determining whether a deployment crash event is occurring. Once the air bag controller 50 determines that a deployment crash event is occurring, the air bag controller 50 is responsive to signals indicating a location of the occupant 40 for controlling inflation of the air bag 28 using the inflation gas control portion 34 of the air bag assembly 22.

The vehicle occupant protection system 20 further includes a stereo-vision assembly 60. The stereo-vision assembly 60 includes an imaging device 61 that is located a housing 62. The housing 62 is preferably mounted to the headliner 64 of the vehicle 26. The imaging device 61 includes two cameras 70 and 72 and an illuminator 74. FIG. 1 illustrates the cameras 70 and 72 and the illuminator 74 located in the housing 62.

Alternatively, the illuminator 74 may be mounted on the instrument panel 24 of the vehicle 26. In accordance with one exemplary embodiment of the present invention, the cameras 70 and 72 are spaced apart from one another by approximately 35 millimeters, although other spacing may be used. The cameras 70 and 72 are positioned in parallel with the front-to-rear axis of the vehicle, although other orientations are possible.

Each of the cameras 70 and 72 includes a shutter (not shown) that has a variable speed. The variable speed shutters enable exposure times of the cameras 70 and 72 to be varied. When the light intensity is low, the exposure time is lengthened and the shutters remain open for longer periods of time. When the light intensity is high, the exposure time is shortened and the shutter is opened for shorter periods of time.

The illuminator 74 illuminates the passenger compartment 31 of the vehicle 26 to enable the cameras 70 and 72 to obtain images during low ambient light conditions. The illuminator 74 provides a light that is outside of the visible range for the occupant 40 of the vehicle 26. In an exemplary embodiment, the illuminator 74 is a near-infrared light source.

A camera controller 80 is operatively connected to the cameras 70 and 72 and the illuminator 74. The camera controller 80 can take any of several forms such as a microcomputer, discrete circuitry, ASIC, etc. The camera controller 80 controls the illuminator 74 and the cameras 70 and 72. The camera controller 80 is also connected to the air bag controller 50 and provides signals to the air bag controller 50 indicating the location of the occupant 40 relative to the cover 32 of the air bag assembly 22.

The stereo-vision system 60 also includes a nonvolatile memory 78. The memory 78 may form a portion of the camera controller 80 or may be separate from the camera controller. In FIG. 1, the memory 78 is separate from the camera controller 80 and is operatively connected to the camera controller.

The vehicle occupant protection system 20 also includes a vision system error indicator 82. The vision system error indicator 82 is operatively connected to the air bag controller 50 and is actuatable for indicating to the occupant 40 that a vision system error has occurred. The air bag controller 50 is responsive to an error indication signal from the camera controller 80 for actuating the vision system error indicator 82. The vision system error indicator 82 may provide any one or more of an audio, visual, or tactile signal to the occupant 40 of the vehicle 26.

Figure 2:
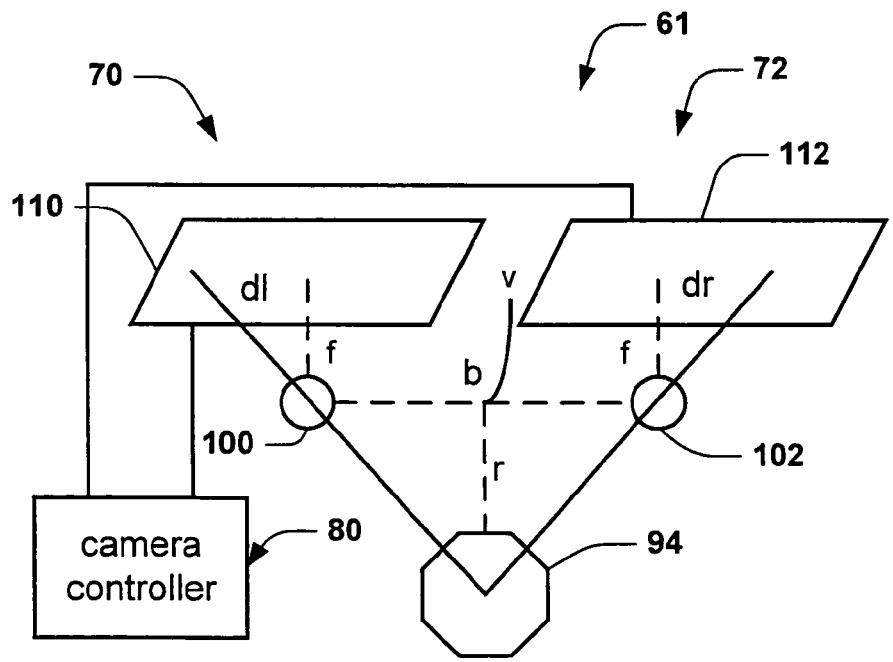
FIG. 2 is a schematic illustration of a stereo-vision assembly of the vehicle occupant protection system of FIG. 1.

FIG. 2 is a schematic illustration of the cameras 70 and 72 of the imaging device 61. The cameras 70 and 72 may be of any several known types. For example, the cameras may be charge-coupled devices ("CCD") or complementary metal-oxide semiconductor ("CMOS") devices. Preferably, the cameras 70 and 72 take two-dimensional, grayscale images of the passenger compartment 31 of the vehicle 26. In one exemplary embodiment of the present invention, the cameras 70 and 72 are wide spectrum response cameras that cover the visible and near-infrared spectrums.

The cameras 70 and 72 are spaced apart from one another so as to enable the cameras to be used for determining a distance, also called a "range," from the cameras to an object. The object is shown schematically in FIG. 2 and is indicated by reference numeral 94. The distance between the cameras 70 and 72 and the object 94 may be determined by using triangulation. The cameras 70 and 72 have different views of the passenger compartment 31 due to the position of the object 94 relative to each camera 70 and 72 being different. As a result, the object 94 is located at a different position in the image obtained by camera 70 than in the image obtained by camera 72. The difference in the positions of the object 94 in the images is referred to as "disparity." To get a proper disparity between the images for performing triangulation, it is desirable for the cameras 70 and 72 to be positioned so that the object 94 to be monitored is within the horopter of the cameras.

Camera 70 includes a lens 100 and a pixel array 110. Likewise, camera 72 includes a lens 102 and a pixel array 112. Since the cameras 70 and 72 are located at different positions relative to the object 94, an image of the object 94 formed on the pixel array 110 of camera 70 differs from an image of the object. 94 formed on the pixel array 112 of camera 72. The distance between the viewpoints of the cameras 70 and 72, i.e., the distance between the lenses 100 and 102, is designated "b" in FIG. 2. The focal length of the lenses 100 and 102 of the cameras 70 and 72 is designated as "f" in FIG. 2. The lenses 100 and 102 of the cameras 70 and 72 of FIG. 2 have the same focal lengths. The horizontal distance from the image center on the pixel array 110 and the image of the object 94 on the pixel array 110 of camera 70 is designated "dl" in FIG. 2. The horizontal distance from the image center on the pixel array 112 and the image of the object 94 on the pixel array 112 for the camera 72 is designated "dr" in FIG. 2. Preferably, the cameras 70 and 72 are mounted so that they are in the same image plane. The difference between dl and dr is referred to as the "image disparity" and is directly related to the distance, designated "r" in FIG. 2, to the object 94 where the distance r is measured normal to the image plane of cameras 70 and 72 from a location v on the image plane. It will be appreciated that $$r=bf/d, \text{ where } d=dl-dr.$$ (Equation 1)

From equation 1, the distance r to the object 94 as a function of disparity of the images from cameras 70 and 72 can be determined. It should be appreciated that the distance r is an inverse function of disparity.

FIG. 3 is a perspective view of the seat 42 in an unoccupied condition. FIG. 3 also illustrates portions of the interior vehicle structure. The interior vehicle structure includes interior trim 84 for covering the B-pillar of the vehicle 26. The interior vehicle structure also includes an interior door panel 86 having an upper surface 88 and an armrest portion 90.

FIG. 3 also illustrates three identifying marks 104 that are located on the interior vehicle structure and are viewable to the cameras 70 and 72 of the imaging device 61. One of the three identifying marks 104 in FIG. 3 is located on the interior trim 84 that covers the B-pillar. The other two identifying marks 104 are located on the upper surface 88 and on the armrest portion 90 of the interior door panel 86, respectively. The three identifying marks 104 may have other locations on the interior vehicle structure than those illustrated in FIG. 3.

The identifying marks 104 may be formed from a near-infrared dye so as to be invisible to the occupant 40 of the vehicle 26. When the identifying marks 104 are formed from a near-infrared dye, the cameras 70 and 72 are near-infrared cameras configured to obtain images in which the identifying marks are visible. The identifying marks may alternatively be in the visible or infrared spectrum with appropriate type imagers for obtaining the images that include the identifying marks. Alternatively, the three identifying marks 104 may be formed from portions of the interior vehicle structure that have fixed positions relative to a location, indicated schematically in FIG. 2 as v, of the imaging device 61. The portions of the interior vehicle structure that form the identifying marks must be visible in the images taken by the cameras 70 and 72, particularly, when the seat 42 is in the unoccupied condition.

The three identifying marks 104 are positioned in the vehicle so as to be non-collinear from the viewpoint of the cameras 70 and 72. For example, assuming that the view in FIG. 3 is representative of the views from cameras 70 and 72, the locations of the identifying marks 104 do not fall into a straight line. When the three identifying marks 104 are non-collinear, as viewed by the cameras 70 and 72, a plane containing the three identifying marks 104 may be calculated from the locations of the three identifying marks. If, for example, the three identifying marks 104 were collinear, then multiple planes exist that contain the three identifying marks 104.

A plane can be calculated from three non-collinear points, such as points $P_1$, $P_2$, and $P_3$. To calculate the plane two vectors, e.g., $(P_2-P_1)$ and $(P_3-P_1)$, are determined. A normal N to the plane is computed by taking the cross product of the two vectors, $N=(P_2-P_1)(P_3-P_1)$. The equation for the plane is determined from the calculated normal N and one of the points in the plane, e.g., $P_1$. Thus, the equation for the plane is $NP_1$.

The exact three-dimensional location of each of the three identifying marks 104 relative to the location v of the stereo-vision system 60 is predetermined and is stored in the memory 78 of the camera controller 80. Also stored in the memory 78 is an equation defining a predetermined plane that includes the three identifying marks 104.

The three identifying marks 104 are used to determine whether the imaging device 61 of the stereo-vision assembly 60 is calibrated properly. The cameras 70 and 72 each take an image of the passenger compartment 31 of the vehicle 26. A pattern recognition algorithm, such as is performed by a neural network, a support vector machine, or another statistical type of classification algorithm analyzes the images obtained by the cameras 70 and 72 for the identifying marks 104. When all three identifying marks 104 are recognized, the camera controller 80 determines a three-dimensional location of each of the identifying marks 104 relative to the location v of the imaging device 61 using the disparity of the images. The locations of the identifying marks 104 from the images is compared to the predetermined locations of the identifying marks 104 that are stored in the memory 78. When the locations of the identifying marks 104 in the images correspond to the predetermined locations of the identifying marks 104, the imaging device 61 is determined to be calibrated properly.

In an exemplary embodiment of the present invention, the camera controller 80 calculates an identifying plane that includes the three identifying marks 104 of the images from cameras 70 and 72. The identifying plane is compared to the predetermined plane that is stored in the memory 78. When the identifying plane and the predetermined plane are identical, the imaging device 61 is determined to be calibrated properly. When the identifying plane is distorted or shifted relative to the predetermined plane, the imaging device 61 is determined to be out of calibration.

Figure 4:
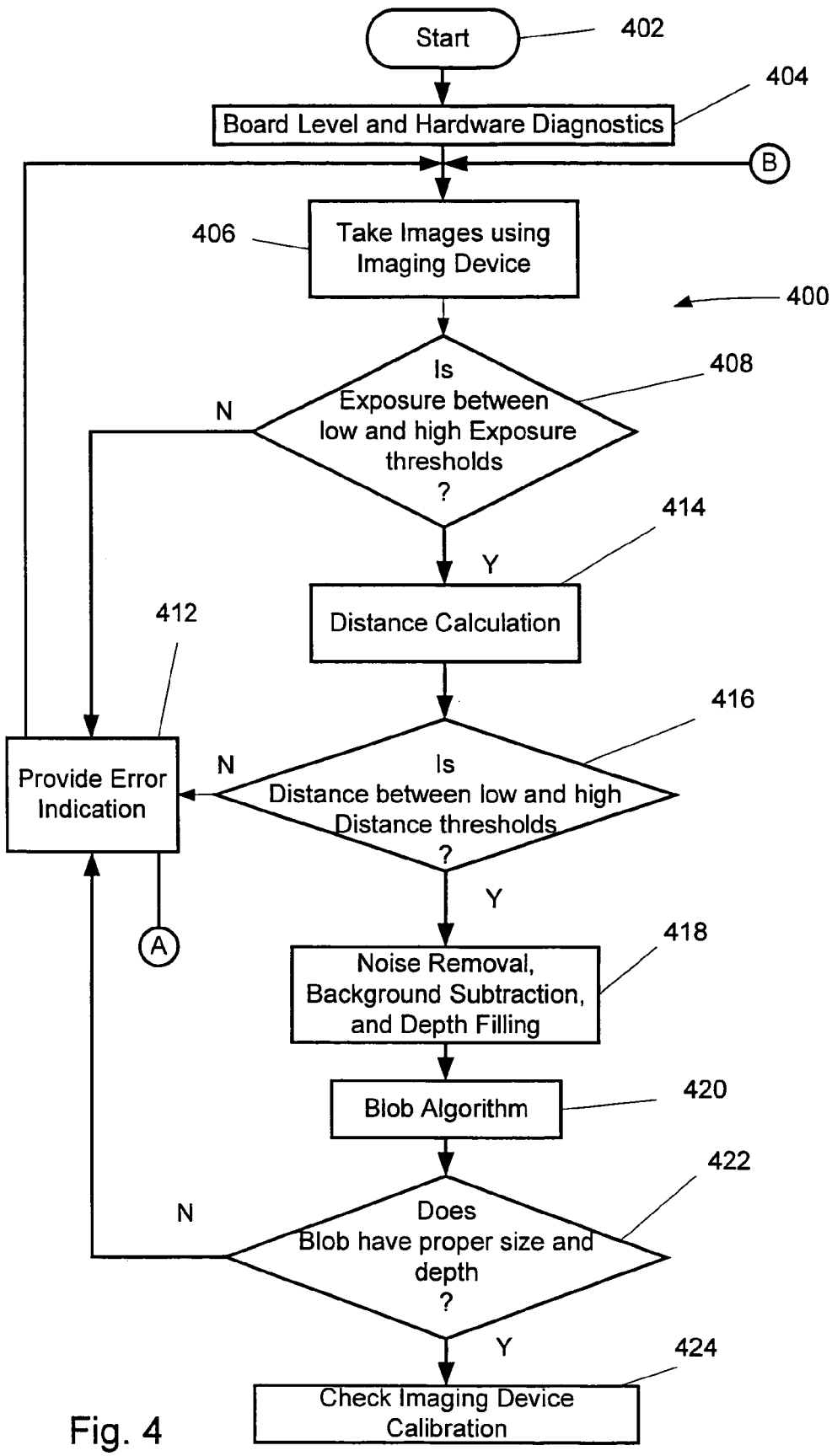
FIG. 4 is flow diagram illustrating a control process in accordance with an exemplary embodiment of the present invention.

Referring to FIG. 4, a control process 400, in accordance with an exemplary embodiment of the present invention, is shown. The process 400 is initialized in step 402 in which internal memories are set to initial conditions, initial flag conditions are set, etc. The initialization at step 402 preferably occurs each time the vehicle ignition (not shown) is started. In step 404, board level diagnostics and hardware diagnostics of the equipment of the stereo-vision assembly 60 is performed. Various board level and hardware diagnostic algorithms are known and may be used at step 404. At step 406, each camera 70 and 72 of the imaging device 61 obtains an image of the passenger compartment 31 of the vehicle 26. The images taken at step 406 include an image of an object, such as occupant 40, located in the seat 42. The process 400 proceds from step 406 to step 408.

At step 408, a determination is made as to whether the exposure of the images obtained at step 406 is between low and high exposure thresholds, i.e., in an exposure range. The exposure is the average intensity from the grayscale image multiplied by the exposure time. The average intensity from the grayscale image is the average pixel value of the pixels in the respective pixel arrays 110 and 112. For example, in an 8-bit image, a pixel value of each pixel is in the range of zero, which is indicative of black, to 255, which is indicative of white. Pixel values between zero and 255 are indicative of shades of gray with lower pixel values being darker and higher pixel values being lighter. The average pixel value is the average value of all of the pixels in the respective pixel array 110 and 112. The exposure time is the time that the shutter of each of the cameras 70 and 72 is open. Preferably, the exposure of each image is determined and is compared to the low and high exposure thresholds at step 408. Since the cameras 70 and 72 are located in close proximity to one another, the exposure of only one of the cameras 70 and 72 may be determined and compared to the low and high exposure thresholds at step 408.

When the determination at step 408 is negative and the exposure of the images is not between the low and high exposure thresholds, i.e., is outside of the exposure range, the process 400 proceeds to step 412 and an error indication is provided. From step 412, the process 400 returns to step 406. When the determination at step 408 is negative, it is highly probable that the view of the passenger compartment 31 from one or both of the cameras 70 and 72 of the imaging device 61 is obstructed. When the determination at step 408 is affirmative and the exposure is between the low and high exposure thresholds, the process 400 proceeds to step 414.

At step 414, a distance calculation takes place to determine the distance r to the object in the images. The distance calculation uses equation 1, above, to determine the distance r. Since the cameras 70 and 72 view the seat 42, the object of the images will be either the seat 42 itself or an object interposed between the cameras 70 and 72 and the seat, such as the occupant 40 of the seat.

At step 416, a determination is made as to whether the distance r, determined from the distance calculation at step 414, is between low and high distance thresholds, i.e., in a distance range. In an exemplary embodiment of the present invention, the low distance threshold is twenty-five centimeters and the high distance threshold is one meter. When the determination at step 416 is negative and the distance r is not between the low and high distance thresholds, i.e., is outside of the distance range, the process 400 proceeds to step 412 and an error indication is provided. When the determination at step 416 is negative, it is highly probable that the view of the passenger compartment 31 from one or both of the cameras 70 and 72 of the imaging device 61 is obstructed. When the determination at step 416 is affirmative, the process 400 proceeds to step 418.

Background information and noise are removed at step 418. Additionally, at step 418, the object that appears from processing of the images obtained by the cameras 70 and 72 is depth filled so as to remove discontinuities of the object. Such discontinuations may result from black hair or non-reflective portions of the object, such as non-reflective clothing worn by the occupant 40.

Figure 6:
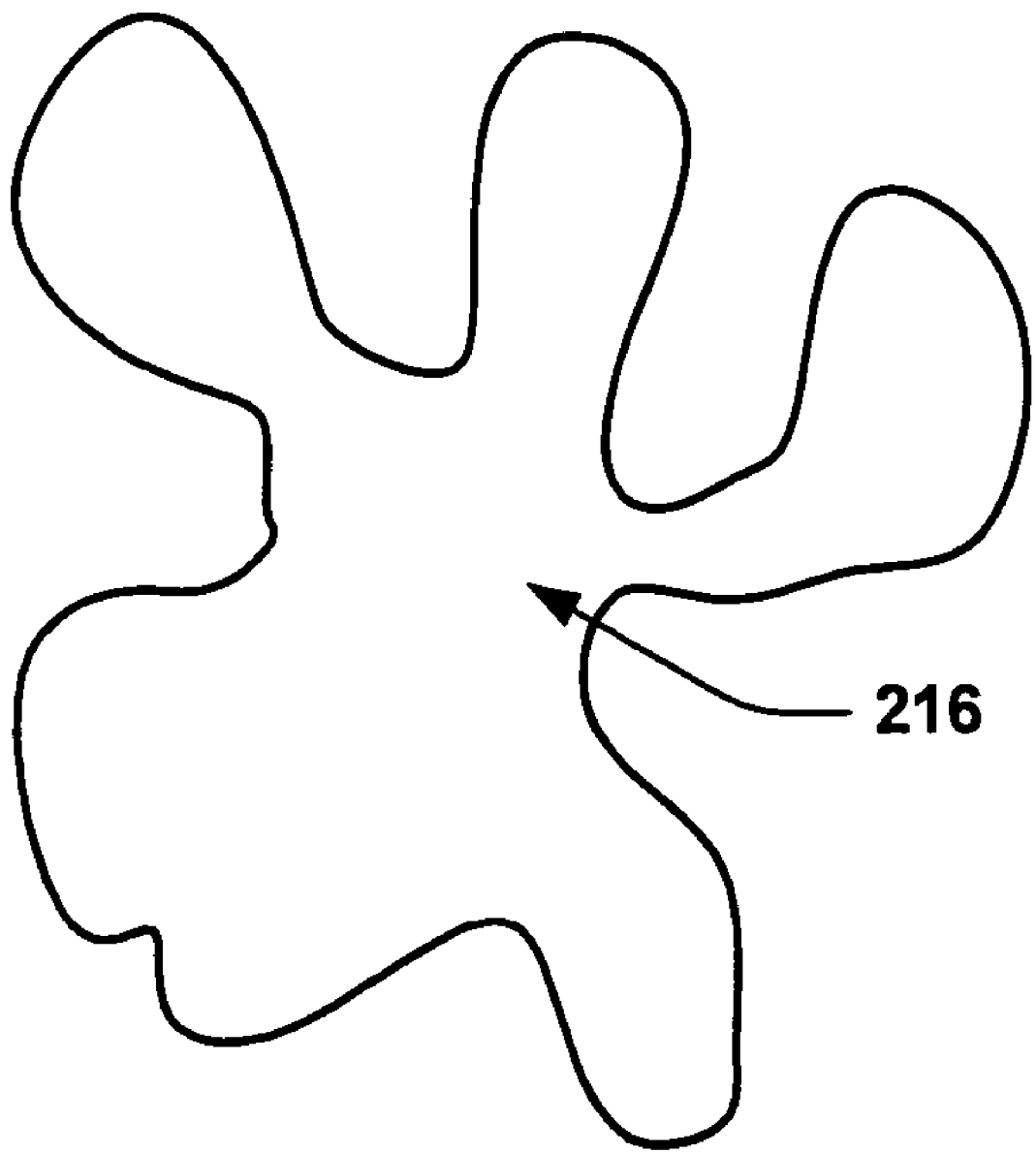
FIG. 6 is a schematic illustration of a blob from an image obtained by the vehicle occupant protection system of the present invention.

From step 418, the process 400 proceeds to step 420 and a blob algorithm is performed. The blob algorithm looks for a blob, such as that shown in FIG. 6 and designated 216, in a three-dimensional image that is formed by combining the two-dimensional images from the cameras 70 and 72. In the blob algorithm, all pixels that have an intensity value equal to or greater than a predetermined value are considered to be ON-pixels and those having an intensity value less than the predetermined value are considered to be OFF-pixels. A run/length coding is used to group all the ON-pixels together and edge detection is performed to find the edges of each blob in the image of the viewing area. Then, the largest blob is selected for further processing.

After the blob algorithm is performed at step 420, the process 400 proceeds to step 422. At step 422, a determination is made as to whether the blob has a proper size and depth. To determine whether the blob 216 has a proper size, the size of the blob 216 is compared to a predetermined blob size range. The predetermined blob size range is indicative of the sizes of typical occupants of the seat. For example, blob sizes ranging from a fifth percentile female occupant to a ninety-fifth percentile male occupant may make up the predetermined blob size range. When the blob 216 falls within the predetermined blob size range, the blob size is determined to the proper. When the blob size is outside of the range, the blob size is determined to be improper. The determined depth of the object is also determined from the three dimensional image of the object. To determine whether the blob 216 has a proper depth, the depth of the blob 216 is compared to a predetermined blob depth range. The predetermined blob depth range is indicative of the depths of typical occupants of the seat. For example, blob depths ranging from a fifth percentile female occupant to a ninety-fifth percentile male occupant may make up the predetermined blob depth range.

When the determination at step 422 is negative and either or both of the size and depth of the blob is determined to be improper, the process 400 proceeds to step 412 and an error indication is provided. When the determination at step 422 is negative, it is highly probable that the view of the passenger compartment 31 from one or both of the cameras 70 and 72 is obstructed. When the determination at step 422 is affirmative, the process 400 proceeds to step 424 and the calibration of the imaging device 61 of the stereo-vision assembly 60 is checked.

Figure 5:
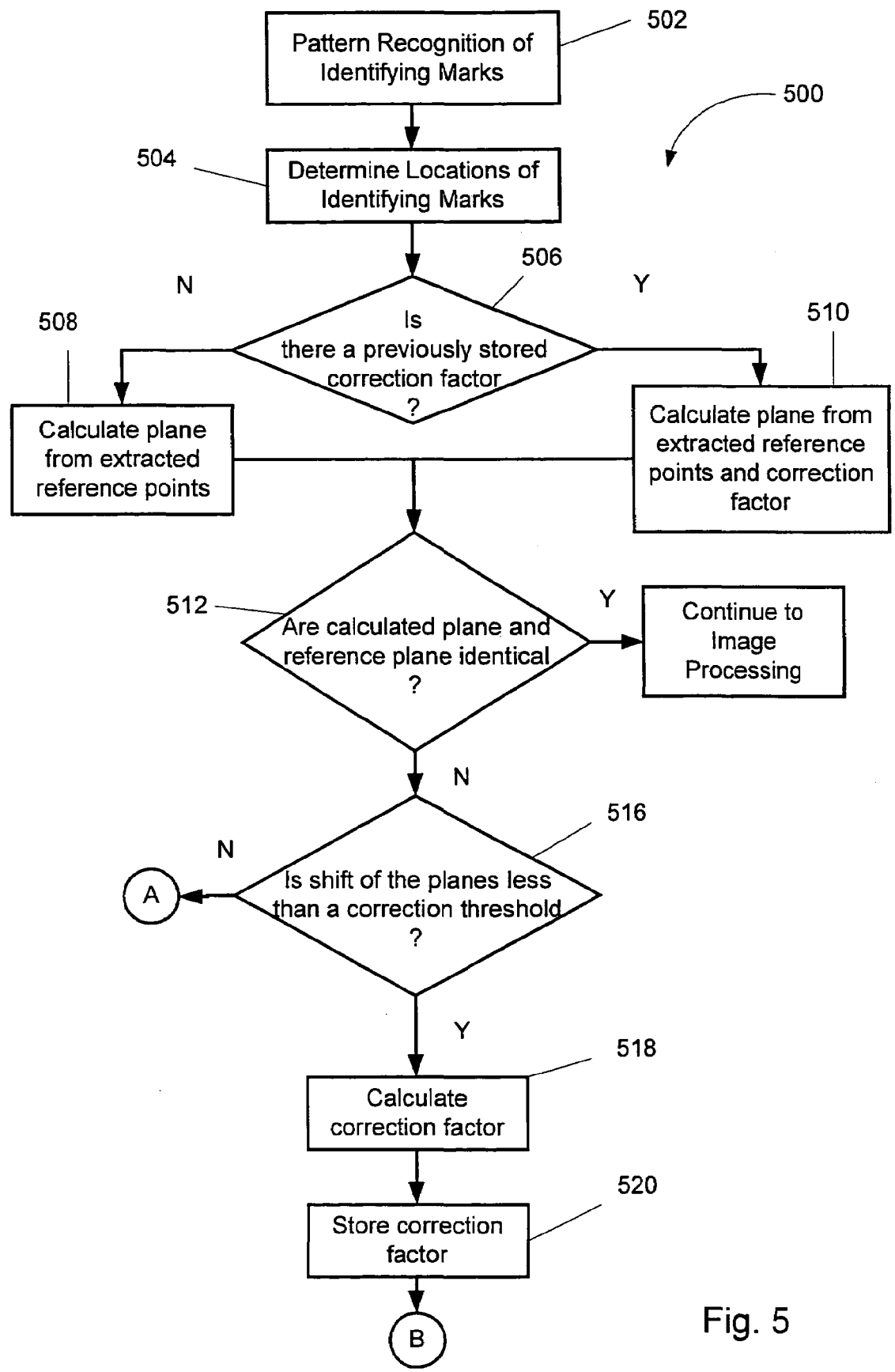
FIG. 5 is a flow diagram illustrating a calibration algorithm in accordance with an exemplary embodiment of the present invention.

FIG. 5 is a flow diagram illustrating a calibration algorithm 500 in accordance with an exemplary embodiment of the present invention. The calibration algorithm 500 begins at step 502 in which a pattern recognition algorithm analyzes the images obtained by the cameras 70 and 72 for the identifying marks 104. The pattern recognition algorithm may use a neural network or a support vector machine for recognizing the identifying marks 104 in the images.

At step 504, the locations of the identifying marks 104 relative to the location v (FIG. 2) of the imaging device 61 of the stereo-vision system 60 is determined. Equation 1, above, is used to determine the distance to the identifying marks so that a three-dimensional location of each mark may be obtained. At step 506, a determination is made as to whether a correction factor has previously been stored in the memory 78. When the determination at step 506 is negative, the calibration algorithm 500 proceeds to step 508. At step 508, an identifying plane that contains the three identifying marks 104 is calculated. From step 508 the process proceeds to step 512.

When the determination at step 506 is affirmative and a correction factor has previously been stored, the calibration algorithm 500 proceeds to step 510. At step 510, an identifying plane is calculated using the locations of the three identifying marks 104 and the correction factor. From step 510, the calibration algorithm 500 proceeds to step 512.

At step 512, the calculated identifying plane is compared to the predetermined plane stored in the memory 78 and a determination is made as to whether the identifying plane and the predetermined plane are identical. When the determination at step 512 is affirmative, the imaging device 61 of the stereo-vision assembly 60 is determined to be calibrated properly, the calibration algorithm 500 ends, and image processing begins so that the location of the object in the passenger compartment 31 of the vehicle 26 is determined. The image processing may use the blob determined at step 420 to determine a location of the occupant's head relative to the cover 32. The camera controller 80 provides the determined location information to the air bag controller 50 for use in controlling inflation of the air bag 28.

When the determination at step 512 is negative, it is determined that the imaging device 61 of the stereo-vision assembly 60 is out of calibration and the calibration algorithm 500 proceeds to step 516. At step 516, a determination is made as to whether the calculated identifying plane has shifted relative to the predetermined plane by an amount less than a predetermined correction threshold. When the determination at step 516 is negative, the calibration algorithm 500 ends and an error indication is provided at step 412 of the process 400 of FIG. 4. When the determination at step 516 is affirmative, the calibration algorithm 500 proceeds to step 518.

At step 518, a correction factor is calculated. The correction factor is an equation representing the shift of the identifying plane from the predetermined plane. By applying the correction factor, when calculating the identifying plane from the identifying marks 104, the identifying plane and the predetermined plane will be identical. Thus, the correction factor recalibrates the imaging device 61 of the stereo-vision assembly 60. At step 520, the correction factor is stored in the memory 78. The calibration algorithm 500 ends after step 520 and the process 400 of FIG. 4 returns to step 406.

When the three identifying marks 104 are not visible in the image, the check of the calibration of the imaging device 61 is skipped and the process 400 of FIG. 4 continues from step 422 directly to the image processing for determining the location of the object. The self-diagnostics set forth in the process 400 of FIG. 4 and the calibration algorithm 500 of FIG. 5 prevent the vehicle occupant protection system 20 from erroneously determining a location of an occupant 40 in response to an obstructed camera 70 or 72 or the imaging device 61 being out of calibration.

From the above description of the invention, those skilled in the art will perceive improvements, changes and modifications. For example, when a determination is made that one or both cameras 70 and 72 is blocked, the air bag controller 50 may use the previous location for the occupant 40 for a predetermined time period to control inflation of the air bag 28. After the predetermined time period, if one or both cameras 70 and 72 remains blocked, the air bag controller 50 controls inflation of the air bag 28 without any occupant location information. Such improvements, changes and modifications within the skill of the art are intended to be covered by the appended claims.

What is claimed is:

1. An apparatus for determining a location of an object in an area of interest within a vehicle, the apparatus comprising:
   an imaging device fixed relative to the vehicle for obtaining an image of the area of interest;
   at least three identifying marks located at predetermined positions relative to the imaging device and in the area of interest within the vehicle;
   a memory in which the predetermined positions of the at least three identifying marks are stored; and
   a controller for determining whether the imaging device is calibrated properly by analyzing the image obtained by the imaging device to determine whether positions of the at least three identifying marks in the obtained image correspond to the predetermined positions stored in the memory, the controller determining a location of the object in the area of interest when the imaging device is calibrated properly.

2. The apparatus of claim 1 wherein the imaging device includes first and second cameras spaced apart from one another.

3. The apparatus of claim 2 wherein each of the first and second cameras is adapted to take a two-dimensional image of the area of interest, the controller forming a three-dimensional image from the two-dimensional images.

4. The apparatus of claim 3 wherein the controller analyzes exposure of at least one of the two-dimensional images taken by the first and second cameras, the controller determining that a view of the area of interest from the imaging device is obstructed when the analyzed exposure is outside of a predetermined exposure range, the controller, in response to determining that the view is obstructed, actuating an indicator for indicating to the object that the imaging device is obstructed.

5. The apparatus of claim 3 wherein the controller determines a distance to the object from disparity of the two-dimensional images, the controller determining that a view of the area of interest from the imaging device is obstructed when the determined distance is outside of a predetermined distance range, the controller, in response to determining that the view is obstructed, actuating an indicator for indicating to the object that the imaging device is obstructed.

6. The apparatus of claim 3 wherein the controller examines the three-dimensional image for blobs, the controller determining that a view of the area of interest from the imaging device is obstructed when a blob of the three-dimensional image has a size that is outside of a predetermined blob size range, the controller, in response to determining that the view is obstructed, actuating an indicator for indicating to the object that the imaging device is obstructed.

7. The apparatus of claim 1 wherein the at least three identifying marks are formed on interior structures of a vehicle and the area of interest is a passenger compartment of a vehicle.

8. The apparatus of claim 7 further including an inflatable air bag, inflation of the air bag being controlled in response to the location of the object in the passenger compartment.

9. The apparatus of claim 7 wherein the at least three identifying marks are formed from dye and the first and second cameras are wide spectrum cameras configured to obtain images including the at least three identifying marks.

10. The apparatus of claim 9 further including a near-infrared illuminator for illuminating the passenger compartment of the vehicle.

11. The apparatus of claim 2 wherein the at least three identifying marks are formed from dye and the first and second cameras are wide spectrum cameras configured to obtain images including the at least three identifying marks.

12. The apparatus of claim 11 further including a near-infrared illuminator for illuminating the area of interest.

13. A method of self-diagnostics of an apparatus for determining a location of an object in an area of interest within a vehicle, the method comprising the steps of:
   obtaining an image of the area of interest using an imaging device that is fixed relative to the vehicle;

locating at least three identifying marks at predetermined positions relative to the imaging device and in the area of interest within the vehicle;

storing in a memory the predetermined positions of the at least three identifying marks;

determining whether the imaging device is calibrated properly by analyzing the obtained images to determine whether positions of the at least three identifying marks in the obtained images correspond to the predetermined positions stored in the memory; and determining a location of the object in the area of interest when the imaging device is calibrated properly.

14. The method of claim 13 wherein the step of obtaining an image of the area of interest further includes the steps of:

taking first and second two-dimensional images of the area of interest; and forming a three-dimensional image of the area of interest from the first and second two-dimensional images.

15. The method of claim 14 further including the steps of:

analyzing exposure of at least one of the first and second two-dimensional images;

determining that a view of the area of interest from the imaging device is obstructed when the analyzed exposure is outside of a predetermined exposure range; and providing an indication when the view is obstructed.

16. The method of claim 14 further including the steps of:

determining distance to the object using disparity of the first and second two-dimensional images;

determining that a view of the area of interest from the imaging device is obstructed when the determined distance is outside of a predetermined distance range; and providing an indication when the view is obstructed.

17. The method of claim 14 further including the steps of:

examining the three-dimensional image for blobs;

determining that a view of the area of interest from the imaging device is obstructed when a blob of the three-dimensional image has a size that is outside of a predetermined blob size range; and providing an indication to the object when the view is obstructed.

18. The method of claim 13 further including the steps of:

determining whether a view of the area of interest from the imaging device is obstructed;

determining the location of the object in the area of interest when the imaging device is calibrated properly and the view is unobstructed; and controlling inflation of an inflatable air bag in response to the determined location of the object in the area of interest.

19. The method of claim 13 further including the steps of:

forming the at least three identifying marks from near-infrared dye; and forming the imaging device from first and second near-infrared cameras that are configured to obtain images including the at least three identifying marks.

20. The method of claim 19 further including the step of:

illuminating the area of interest with near-infrared light.

21. An apparatus for determining a location of an object in an area of interest, the apparatus comprising:

an imaging device for obtaining an image of the area of interest;

a controller for analyzing a feature of the obtained image to determine whether a view of the area of interest from the imaging device is obstructed; and an indicator that is actuatable for indicating that the view is obstructed, the controller controlling actuation of the indicator, the controller analyzing the obtained image to determine the location of the object when the view is unobstructed.

22. The apparatus of claim 21 wherein the imaging device includes first and second cameras spaced apart from one another.

23. The apparatus of claim 22 wherein each of the first and second cameras is adapted to take a two-dimensional image of the area of interest, the controller forming a three-dimensional image from the two-dimensional images taken by the first and second cameras.

24. The apparatus of claim 23 wherein the feature analyzed by the controller is exposure of at least one of the two-dimensional images taken by the first and second cameras, the controller determining that the imaging device is obstructed when the analyzed exposure is outside of a predetermined exposure range.

25. The apparatus of claim 23 wherein the feature analyzed by the controller is a distance to the object, the distance to the object being determined using disparity of the two-dimensional images taken by the first and second cameras, the controller determining that the imaging device is obstructed when the determined distance is outside of a predetermined distance range.

26. The apparatus of claim 23 wherein the feature analyzed by the controller is blobs of the three-dimensional image, the controller determining that the imaging device is obstructed when a blob of the three-dimensional image has a size that is outside of a predetermined blob size range.

27. The apparatus of claim 21 further including:

at least three identifying marks located at predetermined positions in the area of interest;

a memory in which the predetermined positions of the at least three identifying marks are stored; and a controller for determining whether the imaging device is calibrated properly by analyzing the obtained image to determine whether positions of the at least three identifying marks in the obtained image correspond to the predetermined positions stored in the memory.

28. The apparatus of claim 27 wherein the at least three identifying marks are formed on interior structures of a vehicle and the area of interest is a passenger compartment of a vehicle.

29. The apparatus of claim 28 further including an inflatable air bag, inflation of the inflatable air bag being controlled in response to the location of the object in the passenger compartment.

30. The apparatus of claim 28 wherein the at least three identifying marks are formed from near-infrared dye and the imaging device includes first and second near infrared cameras that are configured to obtain images including the at least three identifying marks.

31. The apparatus of claim 30 further including a near-infrared illuminator for illuminating the passenger compartment of the vehicle.

32. A method of self-diagnostics of an apparatus for determining a location of an object in an area of interest, the method comprising the steps of:

obtaining an image of the area of interest with an imaging device;

analyzing a feature of the obtained image to determine whether a view of the area of interest from the imaging device is obstructed;

providing an indication when the view is obstructed; and analyzing the obtained image to determine the location of the object when the view is unobstructed.

33. The method of claim 32 wherein the step of obtaining an image of the area of interest further includes the steps of:
taking first and second two-dimensional images of the area of interest; and
forming a three-dimensional image of the area of interest from the first and second two-dimensional images.

34. The method of claim 33 wherein the step of analyzing a feature further includes the steps of:
analyzing exposure of at least one of the first and second two-dimensional images; and
determining that the imaging device is obstructed when the analyzed exposure is outside of a predetermined exposure range.

35. The method of claim 33 wherein the step of analyzing a feature further includes the steps of:
determining a distance to the object using disparity of the first and second two-dimensional images; and
determining that the imaging device is obstructed when the determined distance is outside of a predetermined distance range.

36. The method of claim 33 wherein the step of analyzing a feature further includes the steps of:
analyzing blobs of the three-dimensional image; and
determining that the imaging device is obstructed when a blob of the three-dimensional image has a size that is outside of a predetermined blob size range.

37. The method of claim 32 further including the steps of:
locating at least three identifying marks at predetermined positions in the area of interest;
storing the predetermined positions of the at least three identifying marks in a memory; and
determining whether the imaging device is calibrated properly by analyzing the obtained image to determine whether positions of the at least three identifying marks in the obtained image correspond to the predetermined positions stored in the memory.

38. The method of claim 37 further including the steps of:
forming the at least three identifying marks from dye; and
forming the imaging device from first and second wide spectrum cameras that are configured to obtain images including the at least three identifying marks.

39. The method of claim 38 further including the step of:
illuminating the area of interest with near-infrared light.

40. The method of claim 32 further including the steps of:
determining whether the imaging device is calibrated properly;
determining the location of the object in the area of interest when the imaging device is calibrated properly and the view is unobstructed; and
controlling inflation of an inflatable air bag in response to the determined location of the object in the area of interest.

* * * * *